(12) United States Patent
Sugiura et al.

(10) Patent No.: US 7,867,666 B2
(45) Date of Patent: Jan. 11, 2011

(54) FUEL CELL WITH TRIANGULAR BUFFERS FOR REACTANT GAS AND COOLANT

(75) Inventors: Seiji Sugiura, Utsunomiya (JP); Shuhei Goto, Utsunomiya (JP); Kazuya Sasamoto, Haga-gun (JP); Narutoshi Sugita, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/570,857

(22) Filed: Sep. 30, 2009

(65) Prior Publication Data

US 2010/0035108 A1   Feb. 11, 2010

Related U.S. Application Data

(63) Continuation of application No. 10/533,143, filed as application No. PCT/JP03/13756 on Oct. 28, 2003, now Pat. No. 7,618,735.

(30) Foreign Application Priority Data

| Oct. 28, 2002 | (JP) | ............................. 2002-313242 |
| Nov. 20, 2002 | (JP) | ............................. 2002-336742 |
| Nov. 20, 2002 | (JP) | ............................. 2002-336753 |
| Oct. 21, 2003 | (JP) | ............................. 2003-360900 |
| Oct. 21, 2003 | (JP) | ............................. 2003-360907 |

(51) Int. Cl.
*H01M 8/04* (2006.01)
*H01M 2/00* (2006.01)
*H01M 2/14* (2006.01)

(52) U.S. Cl. ....................... 429/457; 429/452; 429/455; 429/456; 429/512; 429/513

(58) Field of Classification Search ....................... None
See application file for complete search history.

(56) References Cited

U.S. PATENT DOCUMENTS 5,077,148 A * 12/1991 Schora et al. .................. 429/16

(Continued)

FOREIGN PATENT DOCUMENTS

EP   0459940 A1   12/1991

(Continued)

OTHER PUBLICATIONS

Machine translation of JP 2000-164230, Sha et al., Jun. 16, 2000.*

(Continued)

*Primary Examiner*—Dah-Wei D Yuan
*Assistant Examiner*—Kwang Han
(74) *Attorney, Agent, or Firm*—Nelson Mullins Riley & Scarborough LLP; Anthony A. Laurentano

(57) ABSTRACT

An oxygen-containing gas flow field for supplying an oxygen-containing gas from an oxygen-containing gas supply passage to an oxygen-containing gas discharge passage is formed on a first metal plate. The oxygen-containing gas flow field includes oxygen-containing gas flow grooves as serpentine flow grooves having two turn regions T1, T2. The oxygen-containing gas flow grooves have substantially the same length. The oxygen-containing gas flow grooves are connected to an inlet buffer and an outlet buffer at opposite ends. The inlet buffer and the outlet buffer have a substantially triangular shape, and are substantially symmetrical with each other.

6 Claims, 12 Drawing Sheets

U.S. PATENT DOCUMENTS

| | | | |
|---|---|---|---|
| 5,998,055 A | 12/1999 | Kurita et al. | |
| 6,255,011 B1 | 7/2001 | Fujii et al. | |
| 7,413,821 B2 | 8/2008 | Sugiura et al. | |
| 2001/0044042 A1* | 11/2001 | Inoue et al. | 429/35 |
| 2004/0126634 A1 | 7/2004 | Hatoh et al. | |

FOREIGN PATENT DOCUMENTS

| EP | 0521830 B1 | 1/1997 |
|---|---|---|
| EP | 0940868 A2 | 9/1999 |
| JP | 5-190187 | 7/1993 |
| JP | 6-502957 | 3/1994 |
| JP | 6-163063 | 6/1994 |
| JP | 8-222237 | 8/1996 |
| JP | 10-106594 | 4/1998 |
| JP | 2000-164230 | 6/2000 |
| JP | 2000-323149 | 11/2000 |
| JP | 2002-260710 | 9/2002 |
| JP | 2002-530836 | 9/2002 |
| WO | WO-92/04740 A1 | 3/1992 |
| WO | WO-00/31815 A1 | 6/2000 |
| WO | WO-02/47190 A1 | 6/2002 |

OTHER PUBLICATIONS

Supplementary European Search Report for Application No. 03758973.6-2119, dated Feb. 18, 2008.

Japanese Office Action for Application No. 2002-313242, dated Feb. 17, 2009.

* cited by examiner

FUEL CELL WITH TRIANGULAR BUFFERS FOR REACTANT GAS AND COOLANT

RELATED APPLICATIONS

This application is a continuation application of U.S. application Ser. No. 10/533,143 filed Apr. 27, 2005 which is a 35 U.S.C. 371 national stage filing of International Application No. PCT/JP2003/13756, filed 28 Oct. 2003, which claims priority to Japanese Patent Application No. 2002-313242 filed on 28 Oct. 2002, Japanese Patent Application No. 2002-336742 filed 20 Nov. 2002, Japanese Patent Application No. 2002-336753 filed 20 Nov. 2002, Japanese Patent Application No. 2003-360900 filed 21 Oct. 2003, and Japanese Patent Application No. 2003-360907 filed 21 Oct. 2003 in Japan. The contents of the aforementioned applications are hereby incorporated by reference.

BACKGROUND OF THE INVENTION

1. Technical Field

The present invention relates to a fuel cell formed by alternately stacking an electrolyte electrode assembly and separators. The electrolyte electrode assembly includes a pair of electrodes and an electrolyte interposed between the electrodes.

2. Background Art

For example, a solid polymer fuel cell employs a polymer ion exchange membrane as an electrolyte membrane. The electrolyte solid electrolyte membrane is interposed between an anode and a cathode to form a membrane electrode assembly (electrolyte electrode assembly). Each of the anode and the cathode is made of electrode catalyst and porous carbon. The membrane electrode assembly is sandwiched between separators (bipolar plates) to form the fuel cell. In use, generally, a predetermined number of the fuel cells are stacked together to form a fuel cell stack.

In the fuel cell stack, a fuel gas (reactant gas) such as a gas chiefly containing hydrogen (hereinafter also referred to as the hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electric current. An oxidizing gas (reactant gas) such as a gas chiefly containing oxygen (hereinafter also referred to as the oxygen-containing gas) is supplied to the cathode. At the cathode, the hydrogen ions from the anode combine with the electrons and oxygen to produce water.

In the fuel cell, a fuel gas flow field (reactant gas flow field) is formed on a surface of the separator facing the anode for supplying the fuel gas to the anode. An oxygen-containing gas flow field (reactant gas flow field) is formed on a surface of the separator facing the cathode for supplying the oxygen-containing gas to the cathode. Further, a coolant flow field is provided between adjacent surfaces of the separators such that a coolant flows along the separators. Generally, fluid supply passages and fluid discharge passages extend through the fuel cell stack in the stacking direction of the separators. The fuel gas flow field, the oxygen-containing gas flow field, and the coolant flow field include plurality of flow grooves extending from the fluid supply passages to the fluid discharge passages, respectively. The flow grooves are straight grooves, or serpentine grooves.

However, if openings of the fluid supply passage or the fluid discharge passage are small for the plurality of flow grooves, it is required to provide buffers around the fluid supply passage and the discharge passage, respectively, so that a fluid such as the fuel gas, the oxygen-containing gas, or the coolant can flow along the flow grooves smoothly.

For example, a gas flow field plate of a fuel cell as disclosed in Japanese Laid-Open Patent Publication No. 10-106594 is known. According to the disclosure of the Japanese Laid-Open Patent Publication No. 10-106594, as shown in FIG. 12, for example, a gas flow field plate 1 for forming a flow field of the oxygen-containing gas includes a groove member 2 made of carbon or metal. At an upper side of the gas flow field plate 1, an inlet manifold 3 for the oxygen-containing gas is provided. At a lower side of the gas flow field plate 1, an outlet manifold 4 for the oxygen-containing gas is provided.

The groove member 2 has an inlet side channel 5a connected to the inlet manifold 3, an outlet side channel 5b connected to the outlet manifold 4, and an intermediate channel 6 connected between the inlet side channel 5a and the outlet side channel 5b. A plurality of protrusions 7a are formed in the inlet side channel 5a and the outlet side channel 5b such that the inlet side channel 5a and the outlet side channel 5b have matrix patterns. The intermediate channel 6 has a serpentine pattern having a plurality of turn regions. The intermediate channel 6 includes a plurality of straight grooves 8 and channels 9 formed at the turn regions. A plurality of protrusions 7b are formed in the channels 9 such that the channels 9 have matrix patterns.

In the gas flow field plate 1 constructed as described above, the inlet side channel 5a and the outlet side channel 5b function as buffers. Thus, the contact area between the supplied gas and the electrode is large, and the supplied gas can move freely. Further, in the intermediate channel 6, the reactant gas flows uniformly at high speed through the plurality of straight grooves 8.

In the gas flow field plate 1, practically, a plurality of serpentine passages 1a extending from the inlet manifold 3 to the outlet manifold 4 are formed. In the plurality of the straight grooves 8, the respective passages 1a have substantially the same length. Thus, the flow resistance tends to be constant in each of the passages 1a.

However, in the inlet side channel 5a and the outlet side channel 5b which are formed in the matrix patterns by the plurality of protrusions 7a, the passages 1a from the inlet manifold 3 and the outlet manifold 4 to the respective straight grooves 8 have different lengths. Therefore, the flow resistance varies in the inlet side channel 5a and the outlet side flow channels 5b, and thus, it is not possible to supply the reactant gas uniformly over the entire surface of the electrode. Consequently, the reactant gas is not distributed desirably.

Likewise, in the matrix pattern channels 9 formed by the plurality of the protrusion 7b, when reactant gas flows out of the respective straight grooves 8, turns back in the matrix pattern channels 9, and flows into the respective straight grooves 8, since the flow passages 1a have different lengths, the reactant gas are not distributed uniformly. Thus, the reactant gas is not supplied uniformly over the entire surface of the electrode. Thus, the desired power generation performance can not be maintained.

Further, a coolant flow field may be formed on the back surface of the gas flow field plate 1 for supplying a coolant along the surface of the gas flow field plate 1. In this case, for example, an inlet manifold 3a of the coolant is provided adjacent to the inlet manifold 3, and an outlet manifold 4b of the coolant is provided adjacent to the outlet manifold 4. The inlet side channel 5a and the outlet side channel 5b may function as buffers for supplying the coolant to the coolant flow field, and discharging the coolant from the coolant flow field on the back surface of the gas flow field plate 1.

However, the inlet side channel 5a and the outlet side channel 5b as the buffers have a square shape or a rectangular shape. Therefore, the inlet manifolds 3, 3a, and the outlet manifolds 4, 4a can not be provided in a small space on the surfaces of the gas flow field plates efficiently. Therefore, the area of the gas flow field plate 1 which is not used for reaction increases, and the output density per unit area is lowered. Consequently, the gas flow field plate 1 itself has a considerably large size.

SUMMARY OF THE INVENTION

The present invention solves this type of problem, and an object of the present invention is to provide a fuel cell in which the flow resistance in a reactant gas flow field in a serpentine pattern is uniform, and the reactant gas can be distributed over the entire electrode surface desirably, and the desired power generation performance can be maintained.

Further, another object of the present invention is to provide a fuel cell in which, by specially designing the shape of a buffer, the desired function of the buffer is achieved with relatively small area, the output density is improved suitably, and it is possible to downsize the fuel cell easily.

According to the present invention, a reactant gas flow field is formed for supplying a reactant gas along an electrode surface. The reactant gas flow field includes a plurality of serpentine flow grooves having substantially the same length. The serpentine flow grooves include an even number of turn regions formed on a surface of the separator. A substantially triangular inlet buffer connects the serpentine flow grooves and a reactant gas supply passage extending through the fuel cell in a stacking direction of the fuel cell. A substantially triangular outlet buffer connects the serpentine flow grooves and a reactant gas discharge passage extending through the fuel cell in the stacking direction of the fuel cell. The inlet buffer and the outlet buffer are formed substantially symmetrically with each other.

Since the serpentine flow grooves of the reactant gas flow field have substantially the same length, the flow resistance is uniform in each of the serpentine flow grooves. Further, the entire reactant gas flow field from the reactant gas supply passage to the reactant gas discharge passage has the uniform flow resistance, and thus, the reactant gas is distributed efficiently in the reactant gas flow field. Therefore, the power generation performance of the fuel cell is maintained effectively.

Further, according to the present invention, a reactant gas flow field is formed on one surface of a metal separator for supplying a reactant gas along an electrode surface, and a coolant flow field is formed on the other surface of the metal separator for supplying a coolant along the other surface of the metal separator. The metal separator includes a substantially triangular buffer. The buffer has one side connected to a reactant gas passage on the one surface of the metal separator, and another side connected to a coolant passage on the other side of the metal separator, and a still another side connected to the reactant gas flow field and the coolant flow field on both surfaces of the metal separator.

Thus, the buffer has a distribution function of the reactant gas in the reactant gas flow field, a distribution function of coolant in the coolant flow field. Thus, it is possible to simplify and downsize the buffer structure. The buffer has a substantially triangular shape. Each side of the buffer is utilized to maintain the desired area in the flow field. Thus, in comparison with the buffer having a square or rectangular shape, the desired function is maintained with the small area, and the output density per unit area in the entire fuel cell is effectively improved.

DESCRIPTION OF ILLUSTRATED EMBODIMENT

Figure 1:
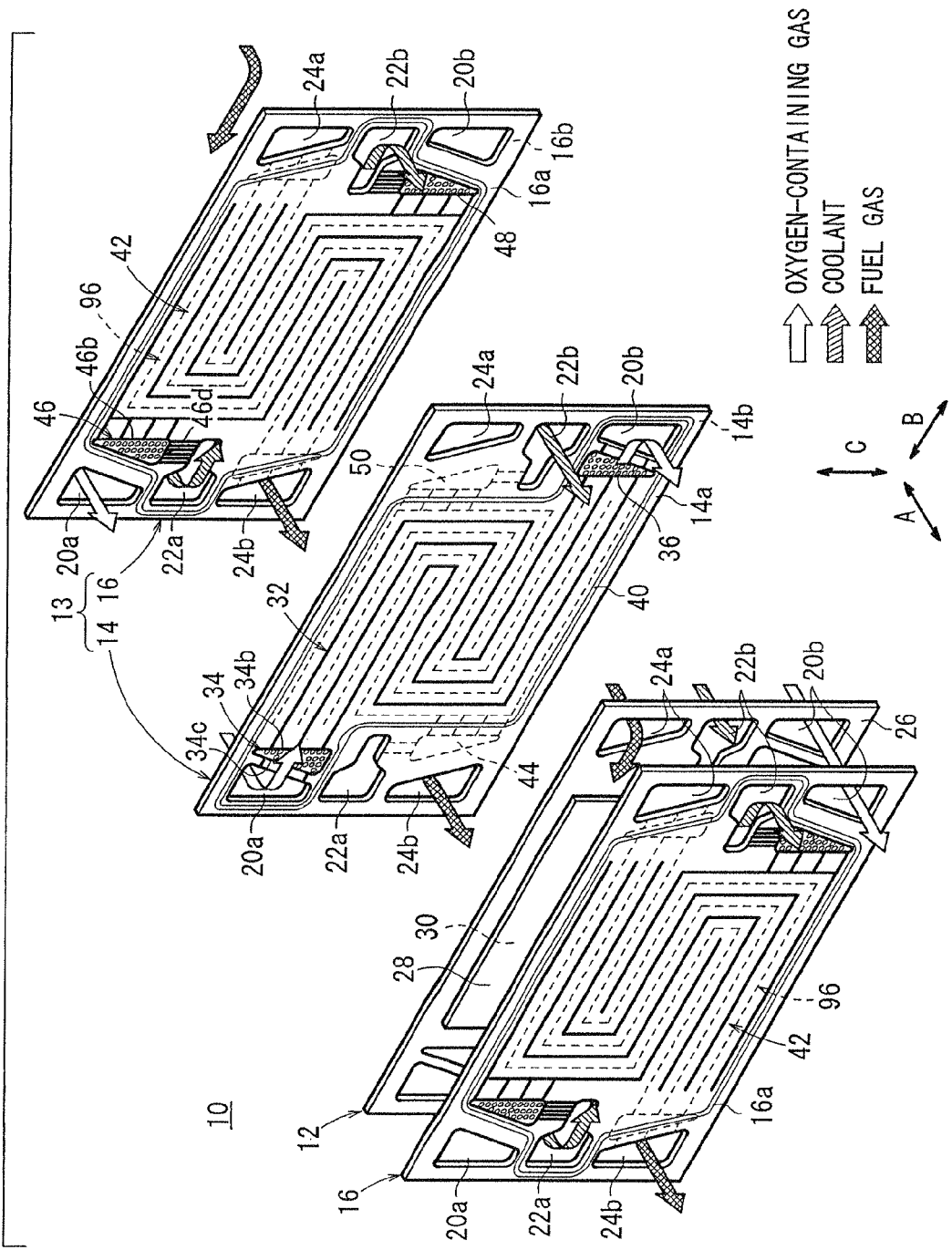
FIG. 1 is an exploded view showing main components of a fuel cell according to an embodiment of the present invention.
Figure 2:
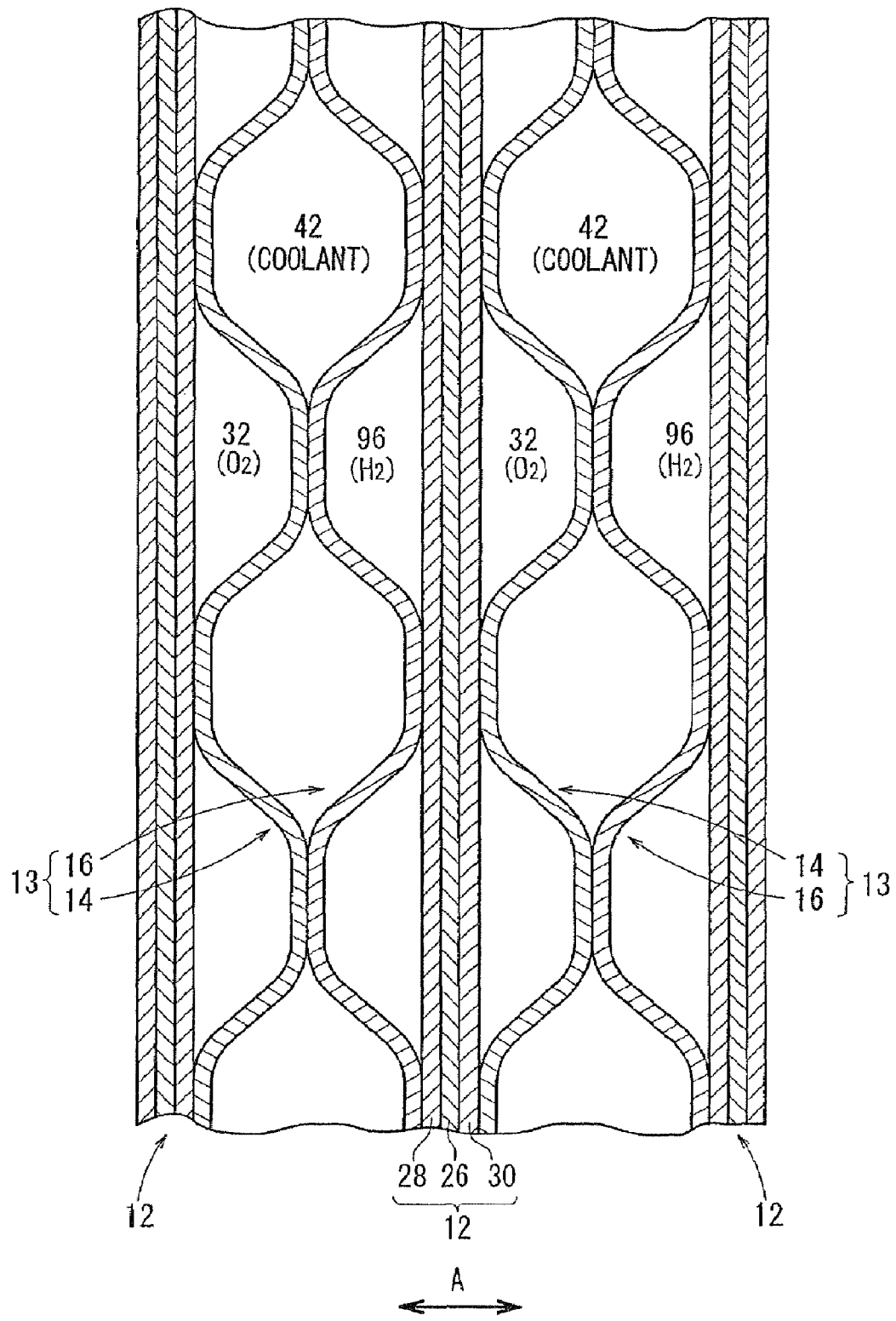
FIG. 2 is a cross sectional view showing a part of the fuel cell.

FIG. 1 is an exploded view showing main components of a fuel cell 10 according to an embodiment of the present invention. FIG. 2 is a cross sectional view showing a part of the fuel cell 10.

The fuel cell 10 is formed by stacking a membrane electrode assembly (electrolyte electrode assembly) 12 and separators (metal separators) 13 alternately. Each of the separators 13 includes first and second metal plates 14, 16, which are stacked together.

As shown in FIG. 1, at one end of the fuel cell 10 in a direction indicated by an arrow B, an oxygen-containing gas supply passage (reactant gas passage) 20a for supplying an oxidizing gas (reactant gas) such as an oxygen-containing gas, a coolant supply passage 22a for supplying a coolant, and a fuel gas discharge passage (reactant gas passage) 24b for discharging a fuel gas (reactant gas) such as a hydrogen-containing gas are arranged vertically in a direction indicated by an arrow C. The oxygen-containing gas supply passage 20a, the coolant supply passage 22a, and the fuel gas discharge passage 24b extend through the fuel cell 10 in a stacking direction indicated by an arrow A.

At the other end of the fuel cell 10 in the direction indicated by the arrow B, a fuel gas supply passage (reactant gas passage) 24a for supplying the fuel gas, a coolant discharge passage 22b for discharging the coolant, and an oxygen-containing gas discharge passage (reactant gas passage) 20b for discharging the oxygen-containing gas are arranged vertically in the direction indicated by the arrow C. The fuel gas supply passage 24a, the coolant discharge passage 22b, and the oxygen-containing gas discharge passage 20b extend through the fuel cell 10 in the direction indicated by the arrow A.

The membrane electrode assembly 12 comprises an anode 28, a cathode 30, and a solid polymer electrolyte membrane 26 interposed between the anode 28 and the cathode 30. The solid polymer electrolyte membrane 26 is formed by impregnating a thin membrane of perfluorosulfonic acid with water, for example.

Each of the anode 28 and cathode 30 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 28 and the electrode catalyst layer of the cathode 30 are fixed to both surfaces of the solid polymer electrolyte membrane 26, respectively.

Figure 3:
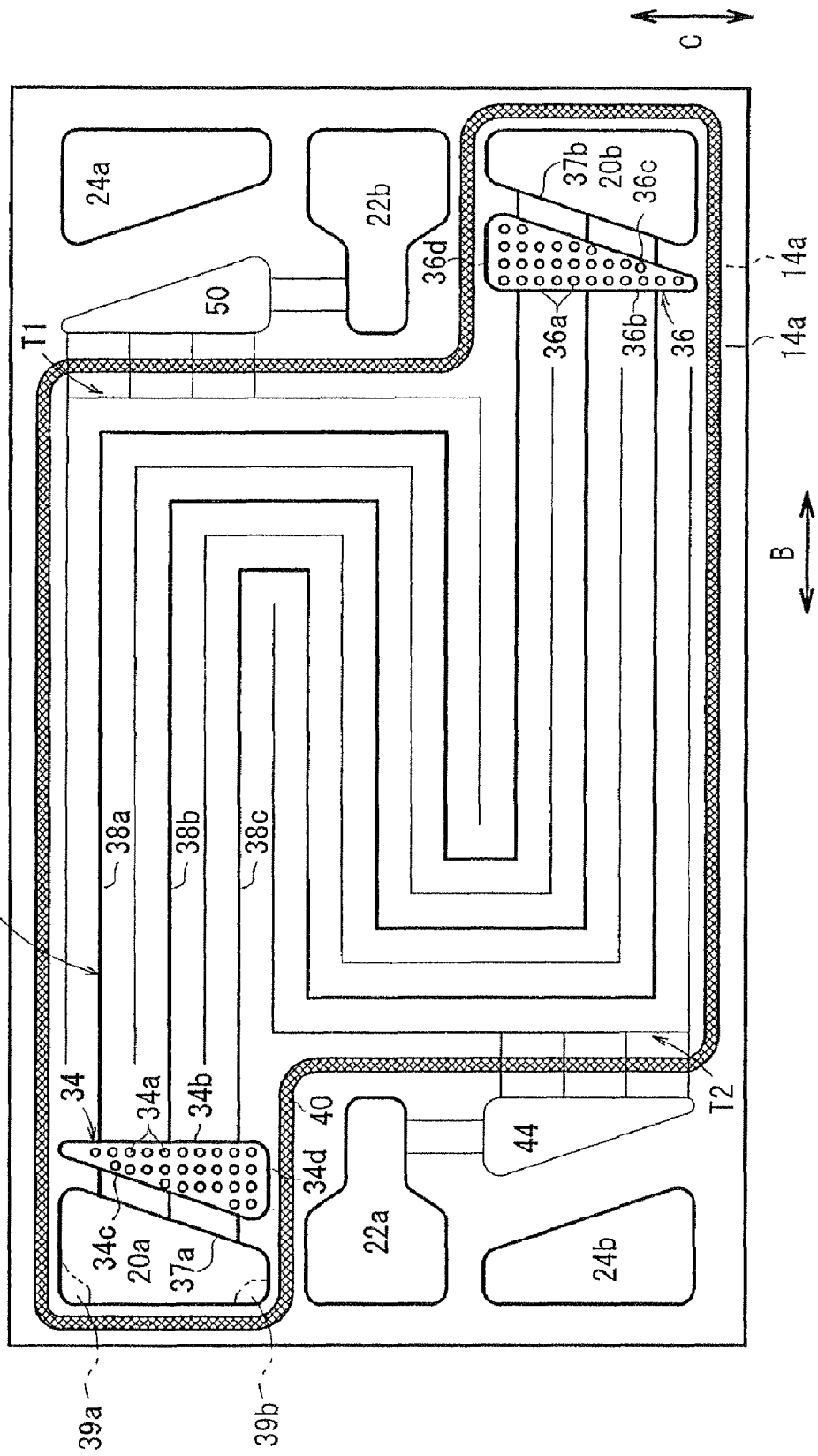
FIG. 3 is a front view showing one surface of a first metal plate.

As shown in FIGS. 1 and 3, the first metal plate 14 has an oxygen-containing gas flow field (reactant gas flow field) 32 on its surface 14a facing the membrane electrode assembly 12. The oxygen-containing gas flow field 32 is connected to the oxygen-containing gas supply passage 20a at one end, and connected to the oxygen-containing gas discharge passage 20b at the other end. A substantially right triangular (substantially triangular) inlet buffer 34 is provided near the oxygen-containing gas supply passage 20a, and a substantially right triangular (substantially triangular) outlet buffer 36 is provided near the oxygen-containing gas discharge passage 20b. The inlet buffer 34 and the outlet buffer 36 are formed substantially symmetrically with each other. The inlet buffer 34 and the outlet buffer 36 include a plurality of bosses 34a, 36a, respectively.

The inlet buffer 34 and the outlet buffer 36 are connected by three oxygen-containing gas flow grooves 38a, 38b, 38c. The oxygen-containing gas flow grooves 38a through 38c extend in parallel with each other in a serpentine pattern for allowing the oxygen-containing gas to flow back and forth in the direction indicated by the arrow B, and flows in the direction indicated by the arrow C. The oxygen-containing gas flow grooves 38a through 38c have two turn regions T1, T2, and three straight regions extending in the direction indicated by the arrow B, for example. The oxygen-containing gas flow grooves 38a through 38c have substantially the same length.

As shown in FIG. 3, a vertical section (one side) 34b of the inlet buffer 34 is oriented toward the direction indicated by the arrow C, and substantially perpendicular to a terminal portion of the oxygen-containing gas flow grooves 38a through 38c. An oblique section 34c of the inlet buffer 34 faces the oxygen-containing gas supply passage 20a. The shape of the oxygen-containing gas supply passage 20a can be selected from various shapes such as a rectangular shape, a parallelogram shape, or a trapezoidal shape. The inner surface of the oxygen-containing gas supply passage 20a has an oblique side 37a facing the inlet buffer 34, and in parallel to the oblique section 34c.

As described above, the shape of the oxygen-containing gas supply passage 20a is selected from various shapes. Further, expansions 39a, 39b expanding toward the oxygen-containing gas supply passage 20a may be provided. The oxygen-containing gas discharge passage 20b, the fuel gas supply passage 24a, and the fuel gas discharge passage 24b have the structure similar to that of the oxygen-containing gas supply passage 20a.

A vertical section (one side) 36b of the outlet buffer 36 is oriented toward the direction indicated by the arrow C, and substantially perpendicular to a terminal portion of the oxygen-containing gas flow grooves 38a through 38c. The oxygen-containing gas flow grooves 38a through 38c have substantially the same length between the vertical sections 34b, 36b. An oblique section 36c of the outlet buffer 36 faces the oxygen-containing gas discharge passage 20b. The inner surface of the oxygen-containing gas discharge passage 20b has an oblique side 37b in parallel to the oblique section 36c.

A line seal 40 is provided on the surface 14a of the first metal plate 14 around the oxygen-containing gas supply passage 20a, the oxygen-containing gas discharge passage 20b, and the oxygen-containing gas flow field 32 for preventing leakage of the oxygen-containing gas.

Figure 4:
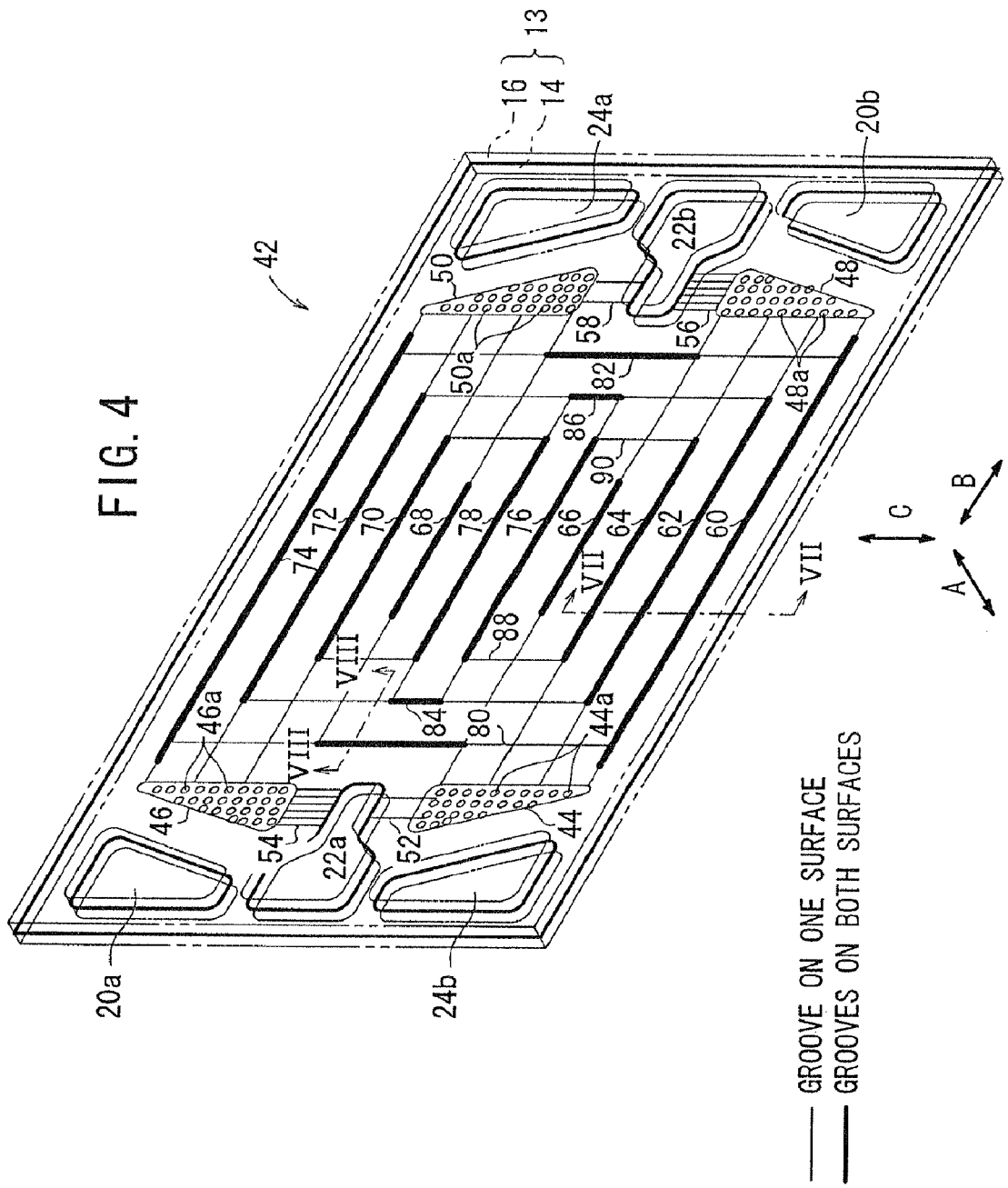
FIG. 4 is a perspective view showing a coolant flow field formed in a separator.

A surface 14b of the first metal plate 14 faces a surface 16a of the second metal plate 16 with each other, and a coolant flow field 42 is formed between the surface 14b of the first metal plate 14 and the surface 16a of the second metal plate 16. As shown in FIG. 4, for example, substantially right triangular (substantially triangular) first and second inlet buffers 44, 46 and substantially right triangular (substantially triangular) first and second outlet buffers 48, 50 are provided in the coolant flow field 42. The first and second inlet buffers 44, 46 are provided at opposite sides of the coolant supply passage 22a in the direction indicated by the arrow C, and the first and second outlet buffers 48, 50 are provided at opposite sides of the coolant discharge passage 22b in the direction indicated by the arrow C.

The first inlet buffer 44 and the second outlet buffer 50 are substantially symmetrical with each other. The second inlet buffer 46 and the first outlet buffer 48 are substantially symmetrical with each other. A plurality of bosses 44a, 46a, 48a, and 50a, are formed on the first inlet buffer 44, the second inlet buffer 46, the first outlet buffer 48, and the second outlet buffer 50, respectively.

The coolant supply passage 22a is connected to the first inlet buffer 44 through a first inlet connection passage 52, and connected to the second inlet buffer 46 through a second inlet connection passage 54. The coolant discharge passage 22b is connected to the first outlet buffer 48 through a first outlet connection passage 56, and connected to the second outlet buffer 50 through a second outlet connection passage 58. The first inlet connection passage 52 comprises, for example, two flow grooves, and the second inlet connection passage 54 comprises, for example, six flow grooves. Likewise, the first outlet connection passage 56 comprises six flow grooves, and the second outlet connection passage 58 comprises two flow grooves.

The number of flow grooves in the first inlet connection passage 52 is not limited to "two", and the number of flow grooves in the second inlet connection passage 54 is not limited to "six". Likewise, the number of flow grooves in the first outlet connection passage 56 is not limited to "six", and the number of flow grooves in the second outlet connection passage 58 is not limited to "two". The number of flow grooves in the first inlet connection passage 52 may be the same as the number of flow grooves in the second inlet connection passage 54, and the number of flow grooves in the first outlet connection passage 56 may be same as the number of flow grooves in the second outlet connection passage 58.

The first inlet buffer 44 and the first outlet buffer 48 are connected by straight flow grooves 60, 62, 64, and 66 extending in the direction indicated by the arrow B. The second inlet buffer 46 and the second outlet buffer 50 are connected by straight flow grooves 68, 70, 72, and 74 extending in the direction indicated by the arrow B. Straight flow grooves 76, 78 extending in the direction indicated by the arrow B for a predetermined distance are provided between the straight flow groove 66 and the straight flow groove 68.

The straight flow grooves 60 through 74 are connected by straight flow grooves 80, 82 which are extending in the direction indicated by the arrow C. The straight flow grooves 62 through 78 are connected with each other by straight flow grooves 84, 86 which are extending in the direction indicated by the arrow C. The straight flow grooves 64, 66, and 76 and the straight flow grooves 68, 70, and 78 are connected with each other by straight flow grooves 88, 90 which are extending in the direction indicated by the arrow C, respectively.

Figure 5:
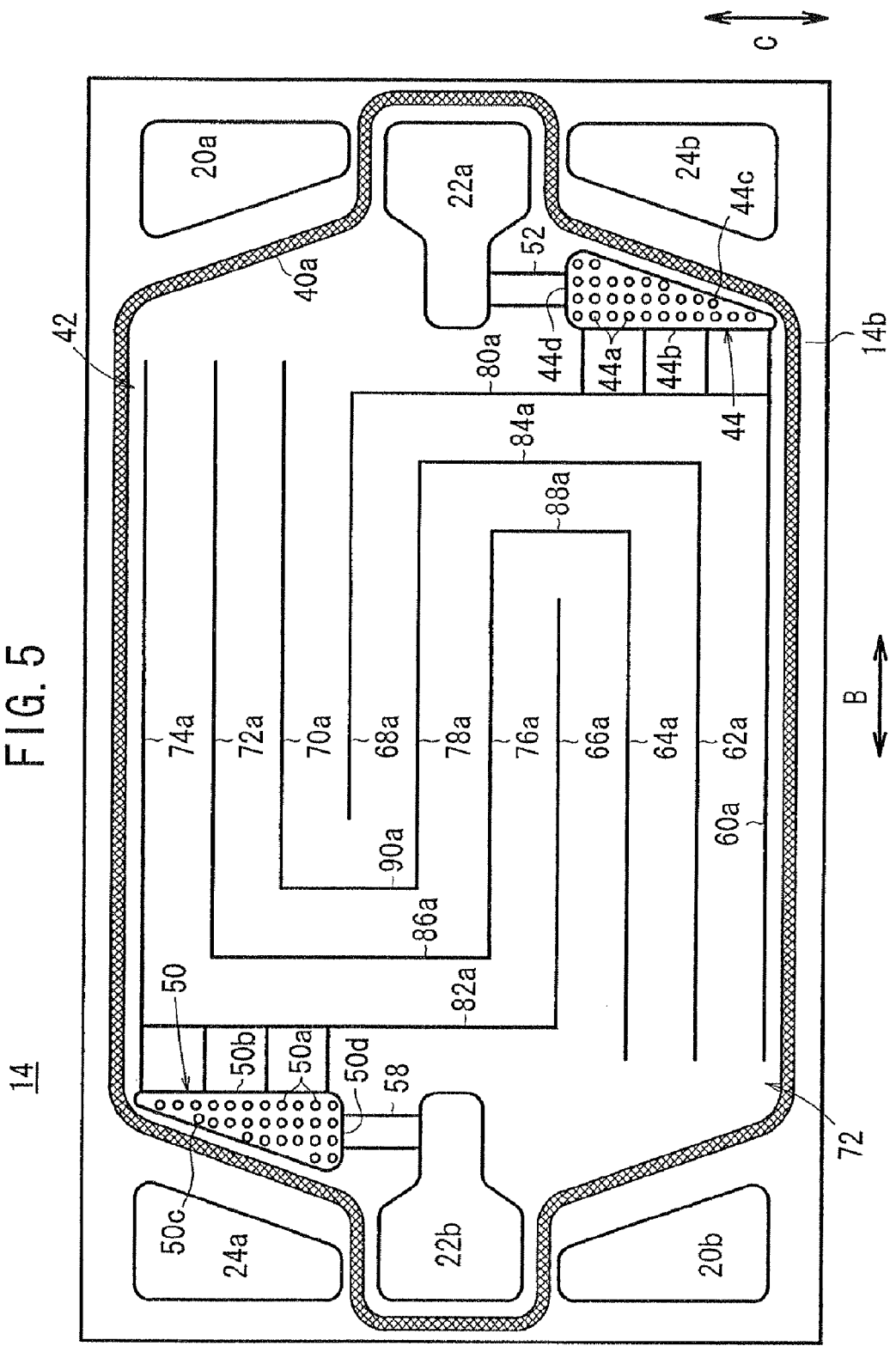
FIG. 5 is a front view showing the other surface of the first metal plate.

The coolant flow field 42 is partially defined by grooves on the surface 14b of the first metal plate 14, and partially defined by grooves on the surface 16a of the second metal plate 16. The coolant flow field 42 is formed between the first metal plate 14 and the second metal plate 16 when the first metal plate 14 and the second metal plate 16 are stacked together. As shown in FIG. 5, the grooves of the coolant flow field 42 is partially formed on the surface 14b where the grooves of the oxygen-containing gas flow field 32 are not formed on the surface 14a.

Protrusions on the surface 14b formed by the grooves of the oxygen-containing gas flow field 32 on the surface 14a are not shown for ease of understanding. Likewise, in FIG. 6, protrusions on the surface 16b formed by the grooves of the fuel gas flow field (reactant gas flow field) 96 on the surface 16a are not shown.

The first inlet buffer 44 connected to the coolant supply passage 22a through the first inlet connection passage 52 comprising the two flow grooves is provided on the surface 14b. Further, the outlet buffer 50 connected to the coolant discharge passage 22b through the second outlet connection passage 58 comprising the two flow grooves is provided on the surface 14b.

Grooves 60a, 62a, 64a, and 66a connected to the first inlet buffer 44 extend discontinuously in the direction indicated by the arrow B for a predetermined distance at intervals. The grooves 60a, 62a, 64a, and 66a are formed where the turn region T2 of the oxygen-containing gas flow grooves 38a through 38c and the outlet buffer 36 are not formed. Grooves 68a, 70a, 72a, and 74a connected to the second outlet buffer 50 extend in the direction indicated by the arrow B. The grooves 68a, 70a, 72a, and 74a are formed where the turn region T1 of the oxygen-containing gas flow grooves 38a through 38c and the inlet buffer 34 are not formed.

The grooves 60a through 78a are part of the straight flow grooves 60 through 78, respectively. Grooves 80a through 90a of the straight flow grooves 80 through 90 extend in the direction indicated by the arrow C for a predetermined distance where the serpentine oxygen-containing gas flow grooves 38a through 38c are not formed.

Figure 6:
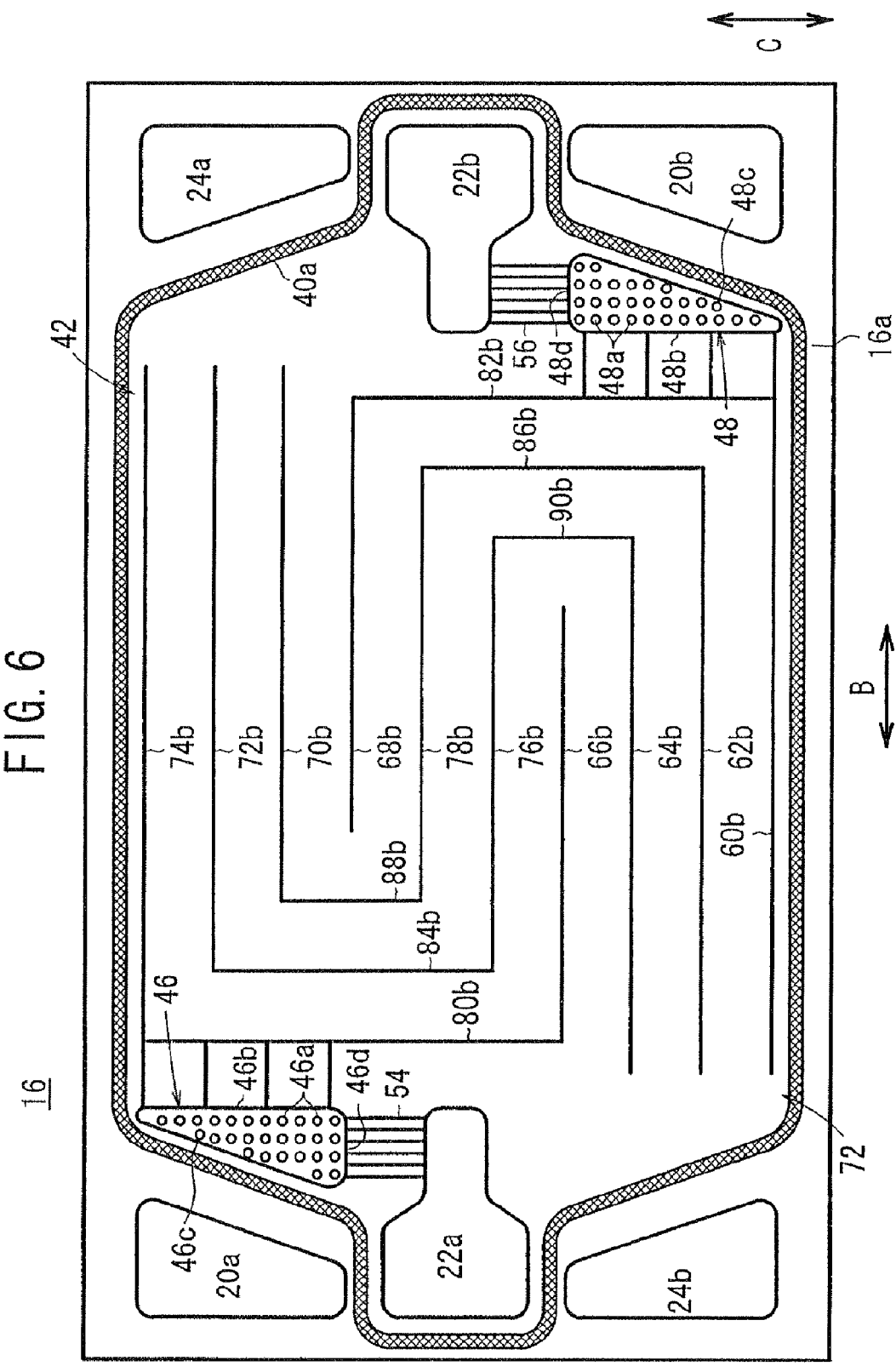
FIG. 6 is a front view showing one surface of a second metal plate.

As shown in FIG. 6, the grooves of the coolant flow field 42 is partially formed on the surface 16a of the second metal plate 16 where the grooves of the fuel gas flow field 96 as described later are not formed. Specifically, the second inlet buffer 46 connected to the coolant supply passage 22a, and the first outlet buffer 48 connected to the coolant discharge passage 22b are provided.

Grooves 68b through 74b of the straight flow grooves 68 through 74 connected to the second inlet buffer 46 extend discontinuously in the direction indicated by the arrow B for a predetermined distance at intervals. Grooves 60b through 66b of the straight flow grooves 60 through 66 connected to the first outlet buffer 48 extend in a predetermined pattern. On the surface 16a, grooves 80b through 90b of the straight flow grooves 80 through 90 extend in the direction indicated by the arrow C.

In the coolant flow field 42, at part of the straight flow grooves 60 through 78 extending in the direction indicated by the arrow B, the grooves 60a through 78a and the grooves 60b through 78b face each other to form a main flow field. The sectional area of the main flow field in the coolant flow field 42 is twice as large as the sectional area of the other part of the coolant flow field 42 (see FIG. 4). The straight flow grooves 80 through 90 are partially defined by grooves on both surfaces 14b, 16a of the first and second metal plate 14, 16, partially defined on one surface 14b of the first metal plate 14, and partially defined on one surface 16a of the second metal plate 16. A line seal 40a is formed around the coolant flow field 42 between the surface 14b of the first metal plate 14 and the surface 16a of the second metal plate 16.

As shown in FIG. 1, when the first and second metal plates 14, 16 are stacked together, the inlet buffer 34 and the second inlet buffer 46 are at least partially overlapped with each other, and the outlet buffer 36 and the first outlet buffer 48 are at least partially overlapped with each other. As shown in FIG. 3, on the surface (one surface) 14a of the first metal plate 14, the inlet buffer 34 includes the oblique section 34c as one side connected the oxygen-containing gas supply passage 20a, and a short side section 34d as another side, a vertical section 34b as still another side connected to the oxygen-containing gas flow field 32.

On the surface (the other surface) 16a of the second metal plate 16, as shown in FIG. 6, the second inlet buffer 46 includes the oblique section 46c as one side, a short side section 46d as another side, and a vertical section 46b as still another side. On the surface 16a, the short side section 46d of the second inlet buffer 46 is connected to the coolant supply passage 22a, and the vertical section 46b of the inlet buffer 46 is connected to the coolant flow field 42.

As shown in FIG. 3, on the surface 14a of the first metal plate 14, the outlet buffer 36 includes the oblique section 36c as one side connected to the oxygen-containing gas discharge passage 20b, and a short side section 36d as another side, and a vertical section 36b as still another side connected to the oxygen-containing gas flow field 32.

As shown in FIG. 6, on the surface 16a of the second metal plate 16, the first outlet buffer 48 includes an oblique section 48c as one side, a short side section 48d as another side connected to the coolant discharge passage 22b, and a vertical section 48b as still another side connected to the coolant flow field 42.

Figure 7:
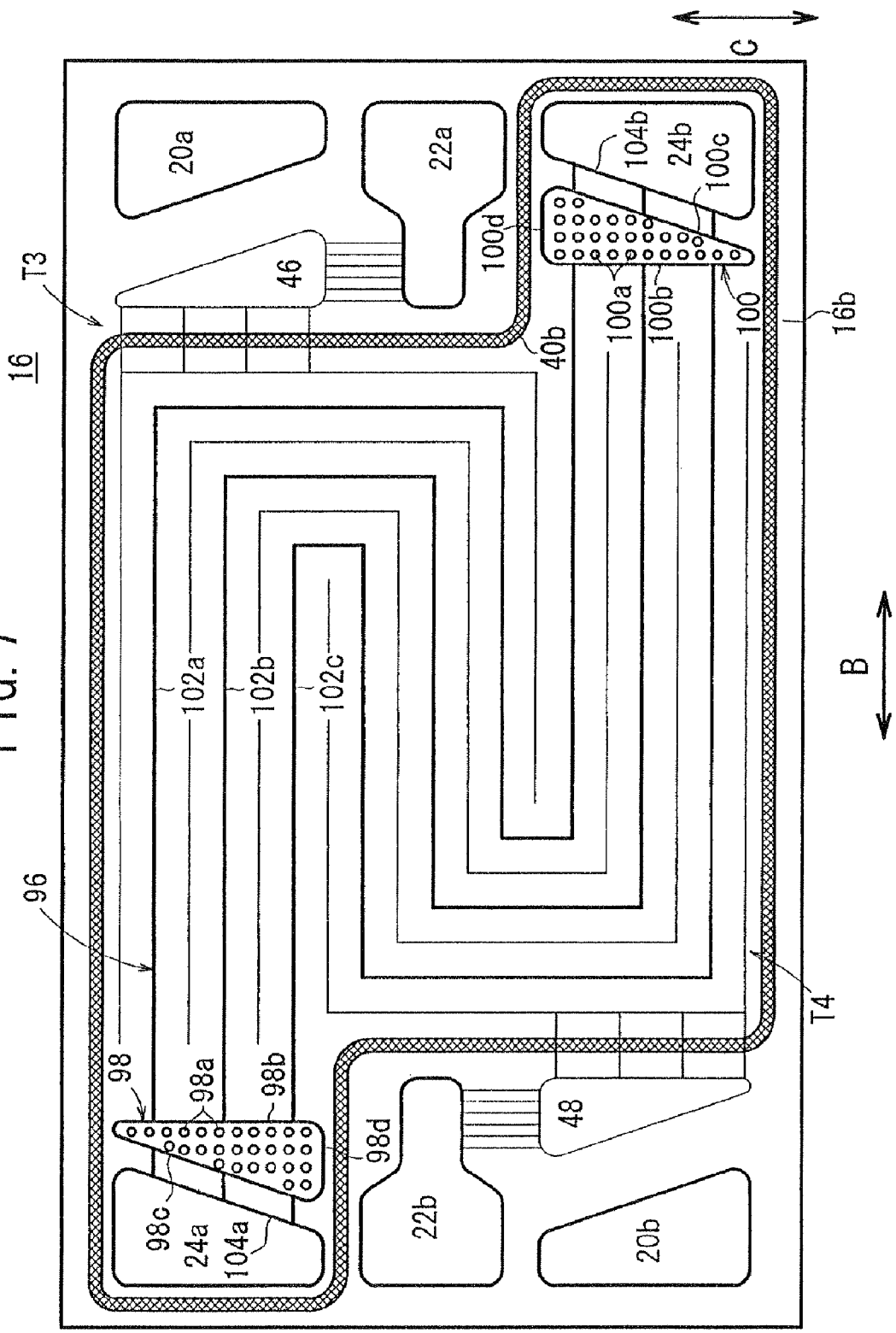
FIG. 7 is a front view showing the other surface of the second metal plate.

As shown in FIG. 7, the second metal plate 16 has the fuel gas flow field 96 on its surface 16b facing the membrane electrode assembly 12. The fuel gas flow field 96 includes a substantially right triangular (substantially triangular) inlet buffer 98 provided near the fuel gas supply passage 24a, and a substantially right triangular (substantially triangular) outlet buffer 100 provided near the fuel gas discharge passage 24b.

The inlet buffer 98 and the outlet buffer 100 are formed substantially symmetrically with each other. The inlet buffer 98 and the outlet buffer 100 include a plurality of bosses 98a, 100a, respectively. For example, the inlet buffer 98 and the outlet buffer 100 are connected by three fuel gas flow grooves 102a, 102b, 102c. The fuel gas flow grooves 102a through 102c extend in parallel with each other in a serpentine pattern for allowing the fuel gas to flow back and forth in the direction indicated by the arrow B, and flows in the direction indicated by the arrow C. The fuel gas flow grooves 38a through 38c are substantially serpentine flow grooves having two turn regions T3, T4, and three straight regions, for example. The fuel gas flow grooves 38a through 38c have substantially the same length.

A vertical section (one side) 98b of the inlet buffer 98 is oriented toward the direction indicated by the arrow C, and substantially perpendicular to a terminal portion of the fuel gas flow grooves 102a through 102c. An oblique section 98c of the inlet buffer 98 faces the fuel gas supply passage 24a. The inner surface of the fuel gas supply passage 24a has an oblique side 104a facing the oblique section 98c, and in parallel to the oblique section 98c. A vertical section (one side) 100b of the outlet buffer 100 is oriented toward the direction indicated by the arrow C, and substantially perpendicular to a terminal portion of the fuel gas flow grooves 102a through 102c. An oblique section 100c of the outlet buffer 100 faces the fuel gas discharge passage 24b. The inner surface of the fuel gas discharge passage 24b has an oblique side 104b in parallel to the oblique section 100c. On the surface 16b, a line seal 40b is provided around the fuel gas flow field 96.

As shown in FIGS. 5 and 7, the first inlet buffer 44 formed on the surface (one surface) 14b of the first metal plate 14 and the outlet buffer 100 formed on the surface (the other surface) 16b of the second metal plate 16 are overlapped with each other, and the second outlet buffer 50 on the surface 14b and the inlet buffer 98 on the surface 16b are overlapped with each other.

The first inlet buffer 44 has the oblique section 44c as one side, the short side section 44d as another side, and the vertical section 44b as still another side. The outlet buffer 100 has the oblique section 100c as one side, a short side section 100d as another side, and a vertical section 100d as still another side. Likewise, the second outlet buffer 50 has an oblique section 50c as one side, a short side section 50d as another side, and a vertical section 50b as still another side. The inlet buffer 98 has the oblique section 98c as one side, a short side section 98d as another side, and the vertical section 98b as still another side.

Next, operation of the fuel cell 10 according to the first embodiment will be described.

As shown in FIG. 1, an oxidizing gas such as an oxygen-containing gas is supplied to the oxygen-containing gas supply passage 20a, a fuel gas such as a hydrogen-containing gas is supplied to the fuel gas supply passage 24a, and a coolant such as pure water, an ethylene glycol or an oil are supplied to the coolant supply passage 22a.

The oxygen-containing gas flows from the oxygen-containing gas supply passage 20a into the oxygen-containing gas flow field 32 of the first metal plate 14. As shown in FIG. 3, the oxygen-containing gas flows through the inlet buffer 34, and is distributed into the oxygen-containing gas flow grooves 38a through 38c. The oxygen-containing gas flows through the oxygen-containing gas flow grooves 38a through 38c in a serpentine pattern along the cathode 30 of the membrane electrode assembly 12 to induce a chemical reaction at the cathode 30.

The fuel gas flows from the fuel gas supply passage 24a into the fuel gas flow field 96 of the second metal plate 16. As shown in FIG. 7, the fuel gas flows through the inlet buffer 98, and is distributed into the fuel gas flow grooves 102a through 102c. The fuel gas flows through the fuel gas flow grooves 102a through 102c in a serpentine pattern along the anode 28 of the membrane electrode assembly 12 to induce a chemical reaction at the anode 28.

In the membrane electrode assembly 12, the oxygen-containing gas supplied to the cathode 30, and the fuel gas supplied to the anode 28 are consumed in the electrochemical reactions at catalyst layers of the cathode 30 and the anode 28 for generating electricity.

After the oxygen-containing gas is consumed at the cathode 30, the oxygen-containing gas flows into the oxygen-containing gas discharge passage 20b through the outlet buffer 36. Likewise, after the fuel gas is consumed at the anode 28, the fuel gas flows into the fuel gas discharge passage 24b through the outlet buffer 100.

The coolant supplied to the coolant supply passages 22a flows into the coolant flow field 42 between the first and second metal plates 14, 16. As shown in FIG. 4, the coolant from the coolant supply passage 22a flows through the first and second inlet connection passages 52, 54 in the direction indicated by the arrow C, and flows into the first and second inlet buffers 44, 46.

The coolant is distributed from the first and second inlet buffers 44, 46 into the straight flow grooves 60 through 66, and 68 through 74, and flows horizontally in the direction indicated by the arrow B. The coolant also flows through the straight flow grooves 80 through 90, 76, and 78. Thus, the coolant is supplied to the entire power generation surface of the membrane electrode assembly 12. Then, the coolant flows through the first and second outlet buffers 48, 50, and flows into the coolant discharge passages 22b through the first and second outlet connection passages 56, 58.

In the present embodiment, as shown in FIG. 7, the fuel gas flow field 96 includes three fuel gas flow grooves 102a through 102c having the two turn regions T3, T4 on the surface 16b. The fuel gas flow grooves 102a through 102c have substantially the same length. Therefore, the flow resistance in the fuel gas flow grooves 102a through 102c is uniform. Thus, the fuel gas is supplied along the fuel gas flow grooves 102a through 102c uniformly.

Figure 8:
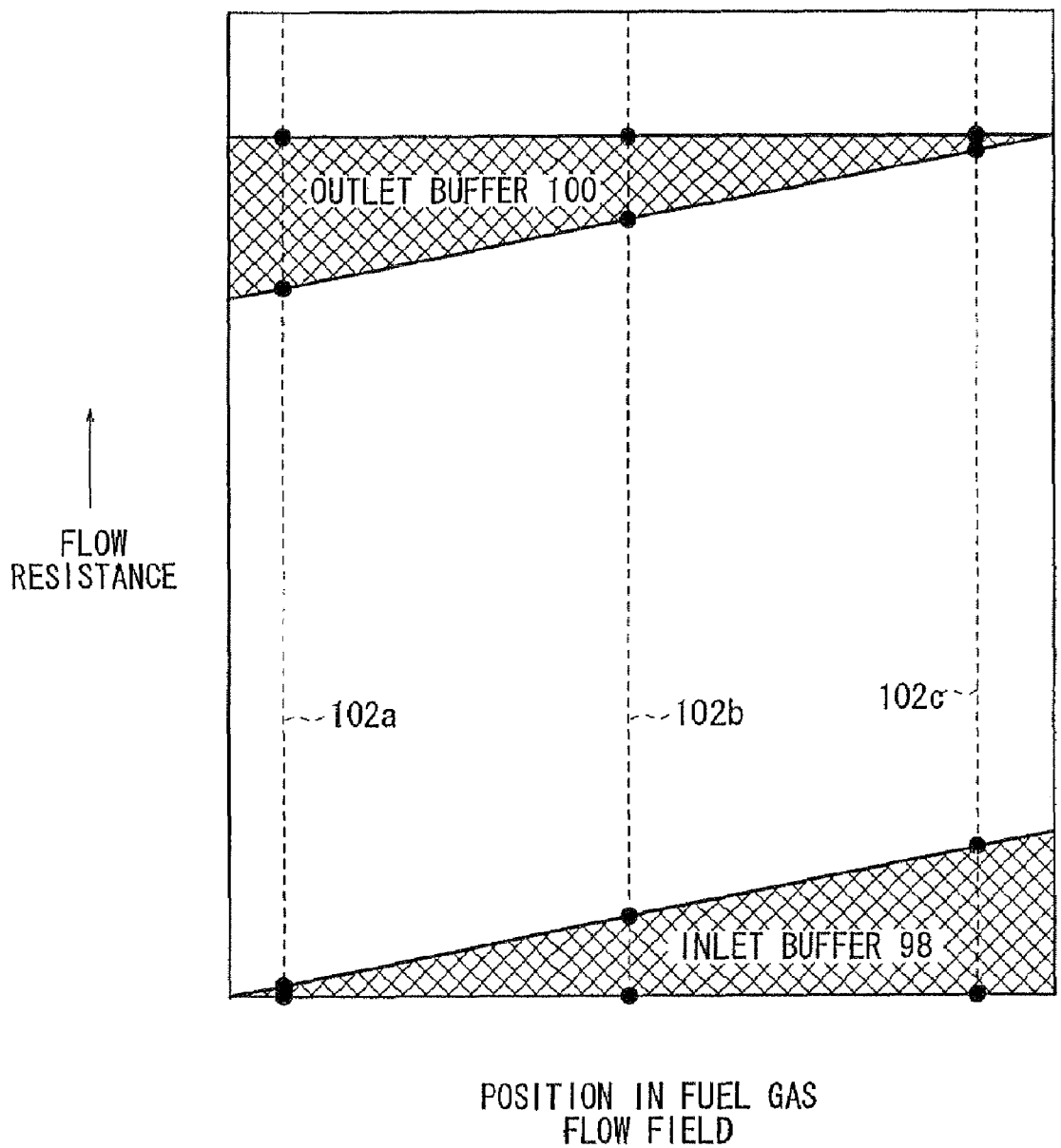
FIG. 8 is a graph showing the relationship between the position of a fuel gas flow field and the flow resistance.

Further, the fuel gas flow field 96 has the inlet buffer 98 and the outlet buffer 100 each having a substantially triangular shape. The inlet buffer 98 and the outlet buffer 100 are formed substantially symmetrically with each other. Thus, as shown in FIG. 8, at both ends of the fuel gas flow grooves 102a through 102c, the sums of the flow resistance in the inlet buffer 98 and the flow resistance in the outlet buffer 100 are substantially the same.

Thus, the flow resistance is uniform in the entire fuel gas flow field 96 from the fuel gas supply passage 24a to the fuel gas discharge passage 24b. The fuel gas is distributed desirably in the fuel gas flow field 96. Therefore, the fuel gas is supplied to the entire electrode surface of the anode 28 uniformly and reliably.

Since the plurality of bosses 98a, 100a are provided in the inlet buffer 98 and the outlet buffer 100, the fuel gas is distributed uniformly, and the mechanical strength is improved for reliably supporting the adjacent membrane electrode assembly 12.

Further, since each of the inlet buffer 98 and the outlet buffer 100 has a substantially triangular shape, the area of the inlet buffer 98 and the area of the outlet buffer 100 are small in comparison with conventional rectangular buffers. Thus, the space needed for the inlet buffer 98 and the outlet buffer 100 is reduced significantly, and it is easy to downsize the separator 13 itself.

Further, the oblique section 98c of the inlet buffer 98 faces, and is in parallel to the oblique side 104a of the fuel gas supply passage 24a. The oblique section 100c of the outlet buffer 100 faces, and is in parallel to the oblique side 104b of the fuel gas discharge passage 24b. Thus, with the simple structure, each of the fuel gas supply passage 24a and the fuel gas discharge passage 24b has the desired cross sectional area.

Further, the vertical section 98b of the inlet buffer 98 and the vertical section 100b of the outlet buffer 100 are substantially perpendicular to the terminal portions of the fuel gas flow grooves 102a through 102c. Thus, the fuel gas smoothly flows from the inlet buffer 98 into the fuel gas flow grooves 102a through 102c, and flows out of the fuel gas flow grooves 102a through 102c to the outlet buffer 100.

As shown in FIG. 3, as with the fuel gas flow field 96, in the oxygen-containing gas flow field 32, the three oxygen-containing gas flow grooves 38a through 38c are serpentine flow grooves having substantially the same length. The inlet buffer 34 and the outlet buffer 36 provided at opposite ends of the oxygen-containing gas flow grooves 38a through 38c have a substantially triangle shape, and are symmetrical with each other.

Thus, it is possible to ensure that the flow resistance is uniform in the entire oxygen-containing gas flow field 32 from the oxygen-containing gas supply passage 20a to the oxygen-containing gas discharge passage 20b. The oxygen-containing gas is distributed efficiently in the oxygen-containing gas flow field 32. Therefore, it is possible to supply the oxygen-containing gas over the entire electrode surface of the cathode 30. Accordingly, the power generation performance of the fuel cell 10 is maintained effectively.

In the present embodiment, as shown in FIG. 1, when the first and second metal plates 14, 16 are stacked together, the inlet buffer 34 and the second inlet buffer 46 are overlapped in the stacking direction. The inlet buffer 34 and the second inlet buffer 46 have a substantially triangular shape (substantially right triangular shape). As shown in FIG. 3, on the surface 14a of the first metal plate 14 (one surface of the separator 13), the oblique section 34c of the inlet buffer 34 is connected to the oxygen-containing gas supply passage 20a, and the vertical section 34b of the inlet buffer 34 is connected to the oxygen-containing gas flow field 32.

Further, as shown in FIG. 6, on the surface 16a of the second metal plate 16 (the other surface of the separator 13), the short side section 46d of the second inlet buffer 46 is connected to the coolant supply passage 22a, and the vertical section 46b of the second inlet buffer 46 is connected to the coolant flow field 42.

Thus, in the separator 13, the inlet buffer 34 and the second inlet buffer 46 are overlapped together to form a single buffer. The buffer has the function of distributing the oxygen-containing gas in the oxygen-containing gas flow field 32, and the function of distributing the coolant in the coolant flow field 42. Thus, it is possible to simplify and downsize the structure of the buffer.

The inlet buffer 34 and the second inlet buffer 46 have a substantially triangular shape. Each side of the buffers is utilized to achieve the desired sectional area of the flow field.

Figure 9:
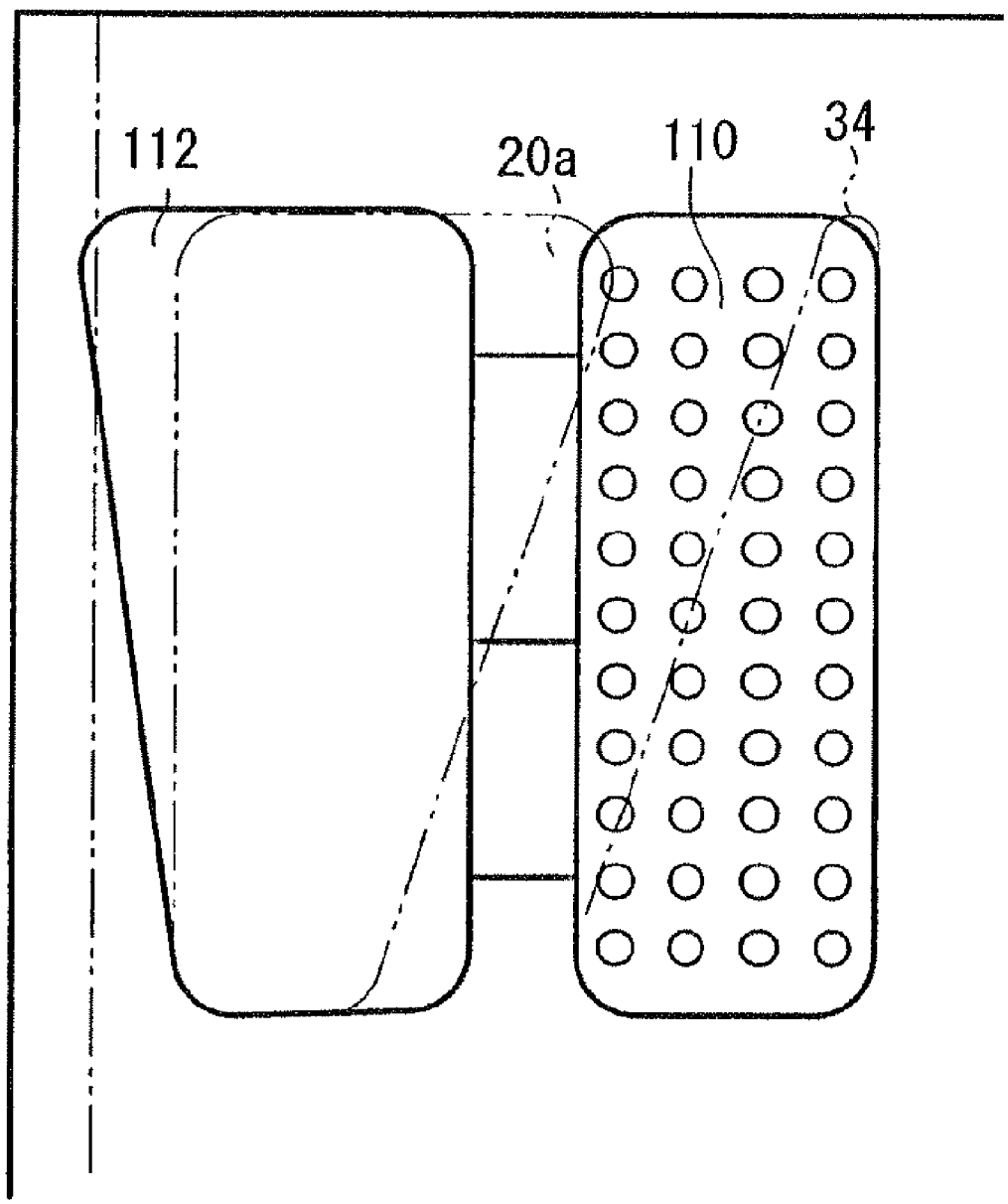
FIG. 9 is a view showing a substantially rectangular inlet buffer.

Thus, for example, as shown in FIG. 9, in comparison with the case where a substantially rectangular inlet buffer 110 is provided, and the oxygen-containing gas supply passage 112 having the opening sectional area equal to that of the oxygen-containing gas supply passage 20a, the width of the first metal plate 14 is reduced by a distance H.

Accordingly, the inlet buffer 34 can maintain the desirable function with the smaller area in comparison with the inlet buffer 110. Thus, in the present embodiment, it is possible to efficiently improve the output density per unit area in the entire fuel cell 10.

The oblique sections 34c, 46c of the inlet buffer 34 and the second inlet buffer 46 face the oblique side 37a of the oxygen-containing gas supply passage 20a, and are in parallel with the oblique side 37a. Thus, with the compact structure, the desired opening cross sectional area of the oxygen-containing gas supply passage 20a is achieved.

Further, the vertical section 34b of the inlet buffer 34 and the vertical section 36b of the outlet buffer 36 are perpendicular to the terminal portions of the oxygen-containing gas flow field grooves 38a through 38c. Therefore, the oxygen-containing gas smoothly flows from the inlet buffer 34 into the oxygen-containing gas flow grooves 38a to 38c, and smoothly flows out of the oxygen-containing gas flow grooves 38a to 38c to the outlet buffer 36.

Further, as shown in FIG. 1, the outlet buffer 36 and the first outlet buffer 48 are overlapped with each other to form the single buffer having a substantially triangular shape. The outlet buffer 36 and the first outlet buffer 48 achieve the same advantages as with the inlet buffer 34 and the second inlet buffer 46. Further, the first inlet buffer 44 and the outlet buffer 100 are overlapped with each other, and the second outlet buffer 50 and the inlet buffer 98 are overlapped with each other to achieve the same advantages as with the inlet buffer 34 and the second inlet buffer 46.

Further, in the present embodiment, the first and second metal plates 14, 16 are stacked together to form the separator 13. Therefore, with the simple structure, the oxygen-containing gas flow field 32, the fuel gas flow field 96, and the coolant flow field 42 are formed easily in the desired pattern such as a serpentine pattern, and the overall size of the fuel cell 10 is reduced. Further, since the serpentine flow passages are formed, the length of the flow passages is long, and the pressure loss is generated to improve the flow speed.

Further, the oxygen-containing gas flow grooves 38a through 38c and the fuel gas flow grooves 102a through 102c are formed in a serpentine pattern having the two turn regions and three straight regions. However, the present invention is not limited in this respect. Any even number of turn regions, such as four turn regions or six turn regions may be provided.

Figure 10:
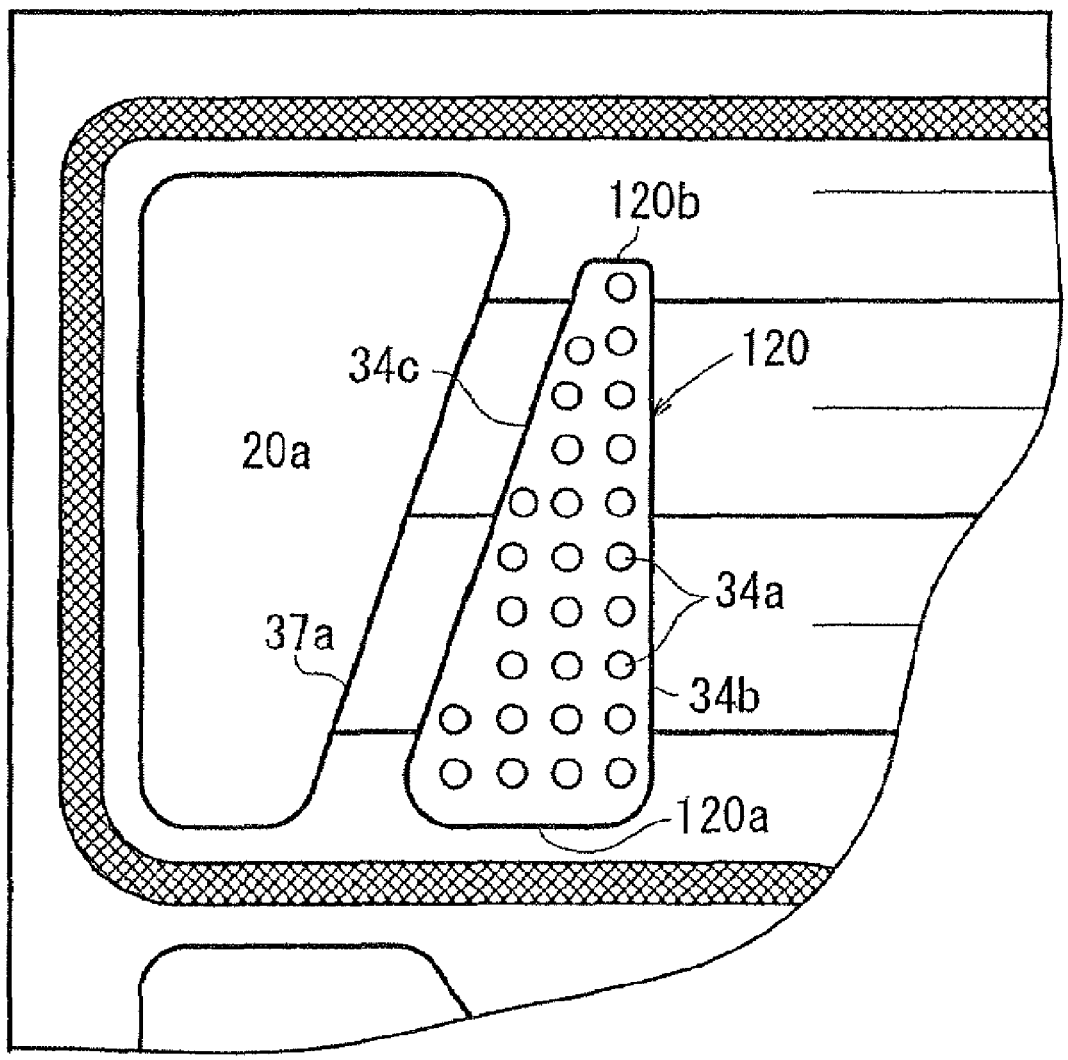
FIG. 10 is a view showing an inlet buffer having another shape.
Figure 11:
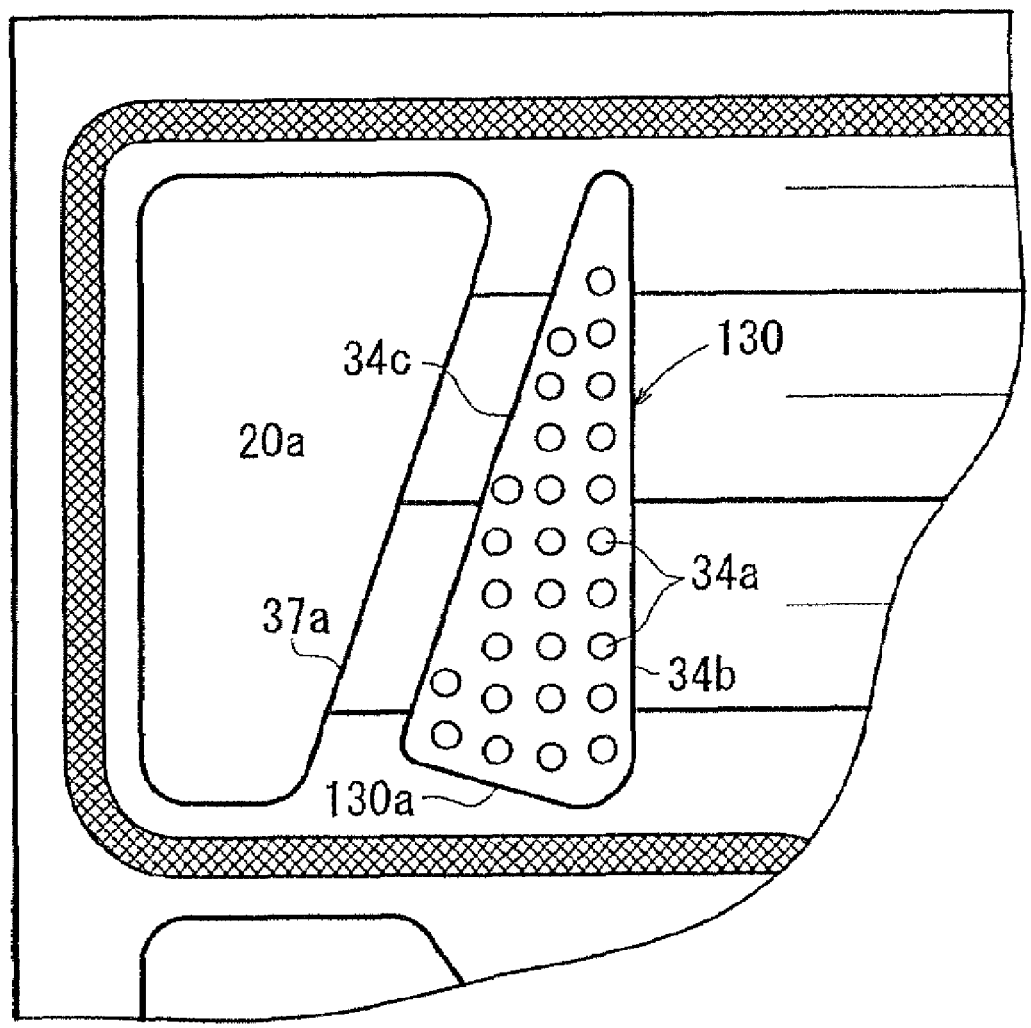
FIG. 11 is a view showing an inlet buffer having a still another shape.
Figure 12:
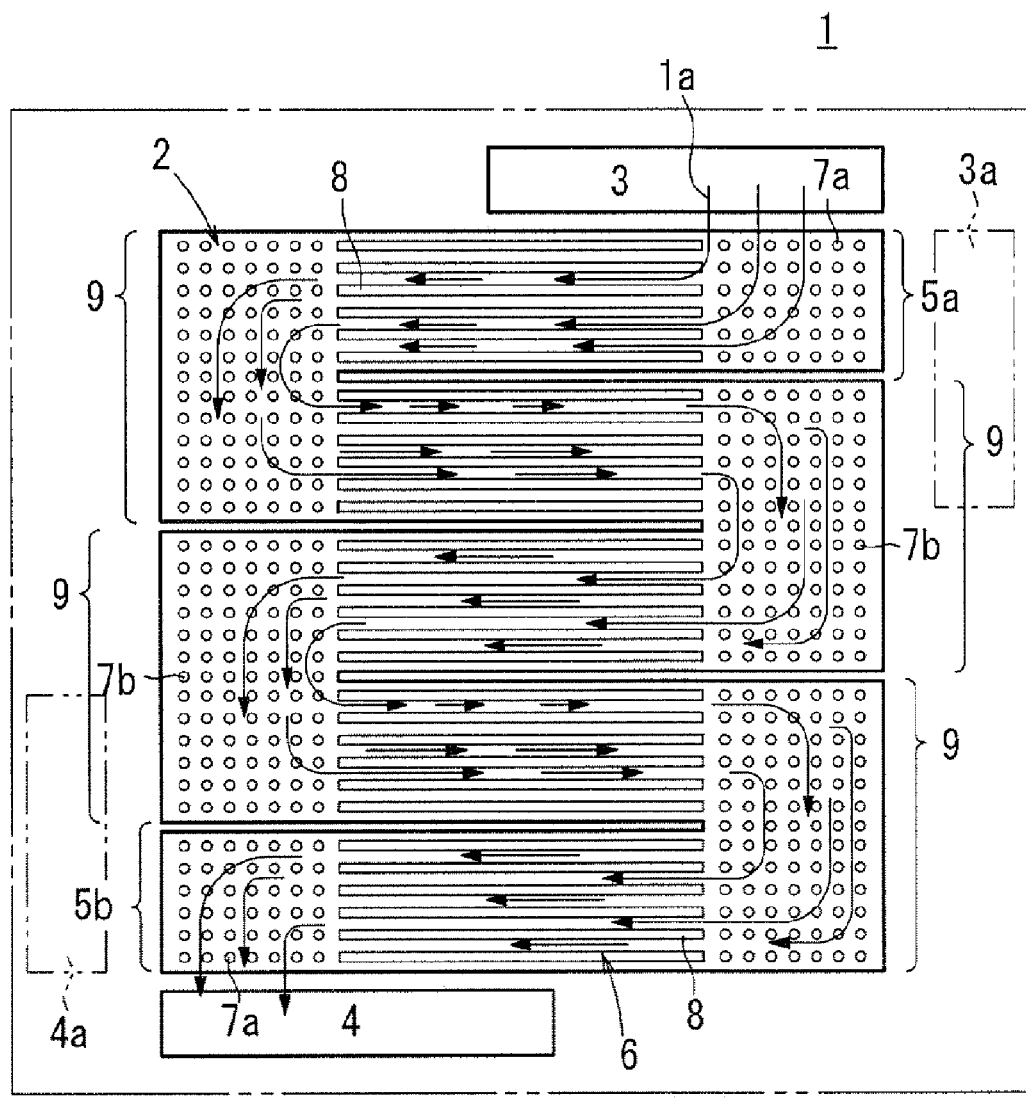
FIG. 12 is a view showing a gas flow field plate of a fuel cell of a Japanese Laid-Open Patent Publication No. 10-106594

Further, in the present embodiment, the inlet buffer 34 has been described as the substantially triangular buffer. However, the present invention is not limited in this respect. FIG. 10 shows a buffer 120 having a substantially rectangular shape (including a substantially trapezoidal shape) including a bottom section 120a and an upper side section 120b. FIG. 11 shows a buffer 130 having a substantially triangular shape including an oblique bottom section 130a.

The invention claimed is:

1. A fuel cell formed by stacking an electrolyte electrode assembly and metal separators alternately, said electrolyte electrode assembly including a pair of electrodes and an electrolyte interposed between said electrodes,
    wherein a reactant gas supply passage and a coolant passage extend through said fuel cell in a stacking direction of said fuel cell;
    a reactant gas flow field is formed on a first surface of said metal separator for supplying a reactant gas along an electrode surface, and a coolant flow field is formed on a second surface of said metal separator opposite to the first surface for supplying a coolant along the second surface of said metal separator;
    said metal separator includes a first triangular buffer formed on the first surface of the separator and a second triangular buffer formed on the second surface of the separator, wherein the first substantially triangular buffer and the second substantially triangular buffer overlap to form a single substantially triangular buffer; and
    said single buffer has a first side connected to said reactant gas supply passage on said first surface of said metal separator, and a second side connected to said coolant passage on second surface of said metal separator, and a third side connected to said reactant gas flow field on the first surface of the metal separator, wherein the third side of the single buffer is connected to said coolant flow field on the second surface of said metal separator.

2. A fuel cell according to claim 1, wherein said reactant flow field includes a flow groove having a curve.

3. A fuel cell according to claim 1, wherein said metal separator includes first and second metal plates which are stacked together;

said first metal plate has said reactant gas flow field on a surface opposite to said second metal plate, and said coolant flow field is formed between said first metal plate and said second metal plate; and a buffer formed on said first metal plate, and a buffer formed on said second metal plate are at least partially overlapped with each other in said stacking direction.

4. A fuel cell according to claim 1, wherein said reactant gas supply passage has at least one oblique side; and said oblique side of said reactant gas passage faces an oblique section of said single buffer.

5. A fuel cell according to claim 1, wherein one side of said single buffer is substantially perpendicular to a terminal portion of said reactant gas flow field.

6. A fuel cell according to claim 1, wherein said reactant gas passage includes a fuel gas supply passage, an oxygen-containing gas supply passage, a fuel gas discharge passage and an oxygen-containing gas discharge passage, and said coolant passage includes a coolant supply passage and a coolant discharge passage; and among six passages comprising said fuel gas supply passage, said oxygen-containing gas supply passage, said coolant supply passage, said fuel gas discharge passage, said oxygen-containing gas discharge passage, and the coolant discharge passage, three passages extend through left ends of said first and second metal plates, and the other three passages extend through right ends of said first and second metal plates.

* * * * *